United States Patent
Yao et al.

(10) Patent No.: US 10,664,080 B2
(45) Date of Patent: May 26, 2020

(54) TOUCH PANEL, TOUCH DETECTION METHOD THEREOF AND DISPLAY DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventors: Zhixiao Yao, Beijing (CN); Ming Tian, Beijing (CN); Jiarong Liu, Beijing (CN); Xiaoyi Zheng, Beijing (CN)

(73) Assignees: BOE Technology Group Co., Ltd., Beijing (CN); Beijing BOE Display Technology Co., Ltd., Beijing (CN)

( * ) Notice: Subject to any disclaimer, the term of this patent is extended or adjusted under 35 U.S.C. 154(b) by 71 days.

(21) Appl. No.: 15/742,319

(22) PCT Filed: Jun. 30, 2017

(86) PCT No.: PCT/CN2017/091112
§ 371 (c)(1),
(2) Date: Jan. 5, 2018

(87) PCT Pub. No.: WO2018/076754
PCT Pub. Date: May 3, 2018

(65) Prior Publication Data
US 2019/0004644 A1    Jan. 3, 2019

(30) Foreign Application Priority Data

Oct. 28, 2016 (CN) .......................... 2016 1 0967159

(51) Int. Cl.
*G06F 3/041* (2006.01)
*G06F 3/042* (2006.01)
(Continued)

(52) U.S. Cl.
CPC ......... *G06F 3/0412* (2013.01); *G02B 26/005* (2013.01); *G06F 3/042* (2013.01);
(Continued)

(58) Field of Classification Search
CPC ...... G06F 3/0414; G06F 3/042; G06F 3/0416; G06F 3/0412; G02F 1/13338
See application file for complete search history.

(56) References Cited

U.S. PATENT DOCUMENTS

2008/0186581 A1* 8/2008 Bita .................... G02B 26/001
                                                          359/578
2009/0065781 A1    3/2009 Chen
(Continued)

FOREIGN PATENT DOCUMENTS

| CN | 101382651 A | 3/2009 |
| CN | 101556515 A | 10/2009 |
| CN | 105867712 A | 8/2016 |

OTHER PUBLICATIONS

International Search Report and Written Opinion dated Sep. 6, 2017; PCT/CN2017/091112.

*Primary Examiner* — Shaheda A Abdin

(57) ABSTRACT

A touch panel, a touch detection method thereof, and a display device are provided. The touch panel includes an electrowetting substrate and a touch substrate which are disposed opposite to each other and a conductive fluid drop disposed between the electrowetting substrate and the touch substrate. The electrowetting substrate includes a first base substrate, a control electrode, and a first insulating layer; the conductive fluid drop is disposed at a side of the first insulating layer away from the control electrode, and corresponds to the control electrode; the touch substrate includes a second base substrate and a touch electrode unit disposed at a side of the second base substrate close to the
(Continued)

electrowetting substrate; the touch electrode unit and the conductive fluid drop are disposed opposite to each other.

19 Claims, 6 Drawing Sheets

(51) Int. Cl.
*G02B 26/00* (2006.01)
*G02F 1/1333* (2006.01)

(52) U.S. Cl.
CPC .......... G06F 3/0414 (2013.01); G06F 3/0416 (2013.01); *G02F 1/13338* (2013.01)

(56) References Cited

U.S. PATENT DOCUMENTS

| | | | |
|---|---|---|---|
| 2010/0220075 A1* | 9/2010 | Kuo | G06F 3/044 345/174 |
| 2014/0009442 A1 | 1/2014 | Kim | |
| 2014/0184522 A1* | 7/2014 | Ma | G06F 3/0412 345/173 |
| 2015/0262521 A1* | 9/2015 | Yeh | G09G 3/16 345/173 |
| 2016/0291738 A1 | 10/2016 | Aoki et al. | |

\* cited by examiner

TOUCH PANEL, TOUCH DETECTION METHOD THEREOF AND DISPLAY DEVICE

The application claims priority to the Chinese patent application No. 201610967159.X, filed Oct. 28, 2016, the disclosure of which is incorporated herein by reference as part of the application.

TECHNICAL FIELD

Embodiments of the present disclosure relate to a touch panel, a touch detection method of the touch panel and a display device.

BACKGROUND

With the continuous development of the touch technology, the touch technology is widely applied in electronic products such as cell phone, tablet computer, and notebook computer day by day. As a human-computer interaction method, the touch technology largely improves the efficiency and convenience of dialogue between human and computer due to the features such as straightforward mode, high efficiency, fluency, and fashion.

Force touch technology is a technology which can sense a force of a touch operation and can callout different functions according to the force of the touch operation, so as to enrich the level and using experience of touch interaction. Besides, in the touch interaction, the force touch technology can also produce touch feedback, so as to better replace the function of a physical button without sacrificing the touch feedback of a physical button.

SUMMARY

At least one embodiment of the present disclosure provides a touch panel, a touch detection method thereof, and a display device. The touch panel can utilize an electrowetting technology to control the surface tension of a conductive fluid drop, to make the shape of the conductive fluid drop deform, so as to utilize the deformation generated by a touch to detect a touch operation, so as to provide a new type touch panel. The touch panel can also recognize a magnitude of a force of the touch operation, so as to improve the touch experience of user. The touch panel can realize recognizing the magnitude of the force of the touch operation by the contact between the conductive fluid drop and the touch electrode structure, which can avoid the wastage produced by the contact of solid sensing elements, so as to enlarge the service life of the touch panel. Moreover, the touch panel can also be applied to an electronic device with a relatively small area and can realize various touch operations and instructions of movement types.

At least one embodiment of the present disclosure provides a touch panel, comprising an electrowetting substrate, a conductive fluid drop and a touch substrate, wherein the touch substrate and the electrowetting substrate are disposed opposite to each other, the conductive fluid drop is disposed between the electrowetting substrate and the touch substrate; the electrowetting substrate comprises a first base substrate, a control electrode disposed at a side of the first base substrate close to the touch substrate, and a first insulating layer disposed at a side of the control electrode close to the touch substrate; the touch substrate comprises a second base substrate and a touch electrode unit disposed at a side of the second base substrate close to the electrowetting substrate; the conductive fluid drop is disposed at a side of the first insulating layer away from the control electrode, and corresponds to the control electrode; the touch electrode unit and the conductive fluid drop are disposed opposite to each other; the touch panel is configured to allow the conductive fluid drop to contact the touch electrode unit under the control of the control electrode to recognize a touch operation upon a touch occurring.

In some examples, the touch electrode unit comprises a touch sensing electrode, the touch sensing electrode comprises: a first sensing electrode and a second sensing electrode which are insulated with each other, and the first sensing electrode and the second sensing electrode are disposed in a same layer.

In some examples, the first sensing electrode is a center electrode, and the second sensing electrode is a ringlike electrode surrounding the first sensing electrode.

In some examples, a shape of the ringlike electrode comprises a rectangle ring, an octagonal ring or a circular ring.

In some examples, along a direction parallel to the second base substrate and passing through a center of the first sensing electrode, a width of the second sensing electrode is larger than that of the first sensing electrode.

In some examples, the touch sensing electrode further comprises: a third sensing electrode, the third sensing electrode is insulated with the first sensing electrode and the second sensing electrode, and the third sensing electrode, the first sensing electrode and the second sensing electrode are disposed in a same layer.

In some examples, the touch electrode structure further comprises at least one direction sensing electrode structure, the direction sensing electrode structure and the touch sensing electrode are disposed at intervals in a same layer and disposed in a periphery of the touch sensing electrode.

In some examples, the direction sensing electrode structure and the touch sensing electrode have a same structure.

In some examples, the at least one direction sensing electrode comprises: a first direction sensing electrode structure; a second direction sensing electrode structure; a third direction sensing electrode structure; and a fourth direction sensing electrode structure, the first direction sensing electrode structure and the third direction sensing electrode structure are arranged along a first direction and disposed at two sides of the touch sensing electrode, the second direction sensing electrode structure and the fourth direction sensing electrode structure are arranged along a second direction and disposed at two sides of the touch sensing electrode, and the first direction is perpendicular to the second direction.

In some examples, the touch panel further comprises an insulating fluid, disposed between the electrowetting substrate and the touch substrate.

In some examples, a density of the conductive fluid drop is smaller than that of the insulating fluid.

In some examples, the touch panel further comprises a first electrode lead, electrically connected with the first sensing electrode; and a second electrode lead, electrically connected with the second sensing electrode, the first electrode lead is configured to input an electrical signal, the second electrode lead is configured to output an electrical signal, or the first electrode lead is configured to output an electrical signal, the second electrode lead is configured to input an electrical signal.

At least one embodiment of the present disclosure provides a display device, which comprises a display panel and a touch panel, wherein the touch panel comprises any one of abovementioned touch panel.

At least one embodiment of the present disclosure provides a touch detection method of a touch panel, used for the abovementioned touch panel, comprising: applying a voltage to the control electrode to control the conductive fluid drop to deform; detecting a contact state between the touch electrode unit and the conductive fluid drop, so as to judge whether there is a touch operation.

In some examples, the touch electrode unit comprises a touch sensing electrode, the touch sensing electrode comprises: a first sensing electrode and a second sensing electrode which are insulated with each other, and the first sensing electrode and the second sensing electrode are disposed in a same layer, the detecting a contact state between the touch electrode unit and the conductive fluid drop, so as to judge whether there is a touch operation comprises: detecting whether the first sensing electrode and the second sensing electrode are conducted or not to judge whether there is a touch operation.

In some examples, the detecting whether the first sensing electrode and the second sensing electrode are conducted or not to judge whether there is a touch operation comprises: applying an electrical signal to one of the first sensing electrode and the second sensing electrode; and detecting whether the other one of the first sensing electrode and the second sensing electrode outputs an electrical signal.

In some examples, the touch detection method further comprises applying an electrical signal to one of the first sensing electrode and the second sensing electrode; and detecting a magnitude of an electrical signal on the other one of the first sensing electrode and the second sensing electrode to judge a magnitude of the touch pressure.

In some examples, the touch detection method further comprises during a time period which the touch operation occurs, gradually increasing or decreasing a magnitude of the voltage applied to the control electrode; and upon detecting the touch electrode unit is conducted, recording the magnitude of the voltage applied on the control electrode.

In some examples, the touch sensing electrode further comprises: a third sensing electrode, the third sensing electrode is insulated with the first sensing electrode and the second sensing electrode, the third sensing electrode, the first sensing electrode and the second sensing electrode are disposed in a same layer, the touch detection method further comprises: detecting whether the third sensing electrode outputs an electrical signal or not.

In some examples, the touch electrode unit further comprises at least one direction sensing electrode structure, the direction sensing electrode structure and the touch sensing electrode are disposed at intervals in a same layer and disposed in a periphery of the touch sensing electrode, the touch detection method further comprises: detecting whether the direction sensing electrode structure is conducted or not, so as to judge whether the touch operation moves along a direction from the touch sensing electrode to the direction sensing electrode structure.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention, not limitative to the present disclosure.

DETAILED DESCRIPTION

Figure 1:
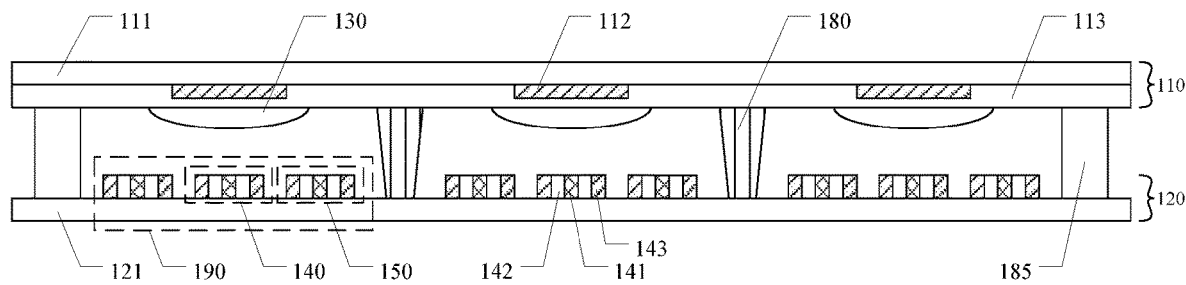
FIG. 1 is a structural schematic diagram of a touch panel provided by an embodiment of the present disclosure.

In order to make objects, technical details and advantages of the embodiments of the present disclosure apparent, the technical solutions of the embodiment will be described in a clearly and fully understandable way in connection with the drawings related to the embodiments of the present disclosure. It is obvious that the described embodiments are just a part but not all of the embodiments of the disclosure. Based on the described embodiments herein, one person skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second," and so on which are used in the description and the claims of the present application for invention, are not intended to indicate any sequence, amount or importance, but distinguish various components. The terms "includes," "including," "includes," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly.

With the continuous development of wearable smart devices, the species of wearable smart devices becomes more and more. However, the inventor(s) of the present application has noticed that: the volume of a conventional wearable smart device (for example, a smart watch) is relatively small; the area of a touch panel is limited, and cannot accomplish various gesture operations of mobile types which are used to a conventional touch panel (for example, a cell phone); in this way, the touch experience of user is lowered. Besides, a general force sensing touch technology realizes recognizing the magnitude of a touch force through the contact of solid sensing elements, such as piezoelectric ceramics. However, because the contact of solid sensing elements would produce relatively large wastage, the serve life of the device adopting the force sensing touch technology would be reduced.

Embodiments of the present disclosure provide a touch panel, a sensing method thereof, and a display device. The touch panel includes an electrowetting substrate, conductive fluid drop, and a touch substrate. The electrowetting substrate includes a first base substrate, a control electrode disposed on the first base substrate, and a first insulating layer disposed on the first base substrate and the control electrode; conductive fluid drop disposed at a side of the first insulating layer away from the control electrode and corresponding to the control electrode, the control electrode being configured to control the surface tension of the conductive fluid drop by voltage. The touch substrate and the electrowetting substrate are disposed opposite to each other, the conductive fluid drop is disposed between the electrowetting substrate and the touch substrate; the touch substrate includes a second base substrate and a touch electrode structure disposed at a side of the second base substrate close to the electrowetting substrate; the touch electrode structure and the conductive fluid drop are disposed opposite to each other, and the touch electrode structure is configured to be conducted by movement of the conductive fluid drop approaching the touch electrode structure so as to detect the touch operation. That is to say, the touch panel can detect the touch operation though contact between the conductive fluid drop and the touch electrode structure under control of the control electrode when the touch operation occurs. The touch panel can utilize an electrowetting technology to control the surface tension of a conductive fluid drop, to make the shape of the conductive fluid drop deform, so as to utilize the deformation produced by a touch to detect a touch operation, so as to provide a new type touch panel. The touch panel can also recognize a magnitude of a force of the touch operation, so as to improve the touch experience of user. The touch panel can realize recognizing the magnitude of the force of the touch operation by the contact between the conductive fluid drop and the touch electrode structure, which can avoid the wastage produced by the contact of solid sensing elements, so as to enlarge the service life of the touch panel. Moreover, the touch panel can also be applied to an electronic device with a relatively small area and can realize various touch operations and instructions of mobile types. It is to be noted that, the abovementioned sensing method of a touch panel refers to a touch detection method of a touch panel.

Hereafter, the touch panel, the touch detection method, and the display device provided by the embodiments of the present disclosure will be described with reference to the accompanying drawings.

First Embodiment

The present embodiment provides a touch panel, as illustrated by FIG. 1, the touch panel includes an electrowetting substrate 110 and a touch substrate 120 which are disposed opposite to each other, and a conductive fluid drop 130 disposed between the electrowetting substrate 110 and the touch substrate 120; the electrowetting substrate 110 comprises a first base substrate 111, a control electrode 112 disposed on the first base substrate 111, and a first insulating layer 113 disposed on the first base substrate 111 and the control electrode 112, the first insulating layer 113 covers the control electrode 112: the touch substrate 120 comprises a second base substrate 121 and a touch electrode unit 190 disposed at a side of the second base substrate 121 close to the electrowetting substrate 110; the conductive fluid drop 130 is disposed at a side of the first insulating layer 113 away from the control electrode 112, and corresponds to the control electrode 112, the control electrode 112 is used to utilize a voltage to control surface tension of the conductive fluid drop 130, that is to say, a projection of the conductive fluid drop 130 on the first insulating layer 113 and a projection of the control electrode 112 on the first insulating layer 113 are at least partially overlapped, such that the control electrode 112 can utilize a voltage to control the surface tension of the conductive fluid drop 130; a touch electrode unit 190 and the conductive fluid drop 130 are disposed opposite to each other, and can be conducted by the downward movement of the conductive fluid drop 130, so as to recognize a touch operation. That is to say, upon a touch operation occurring, the touch panel is configured that the conductive fluid drop 130 contacts the touch electrode unit 190 under the control of the control electrode 112 to recognize the touch operation. It is to be noted that, the abovementioned "downward movement" refers to a movement towards the touch electrode unit.

Figure 2:
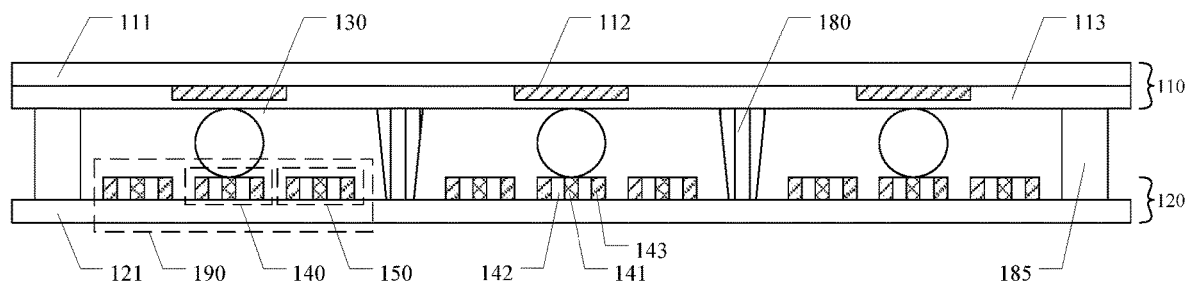
FIG. 2 is a schematic diagram of a touch panel, after an control electrode being applied with a voltage, provided by an embodiment of the present disclosure.
Figure 3:
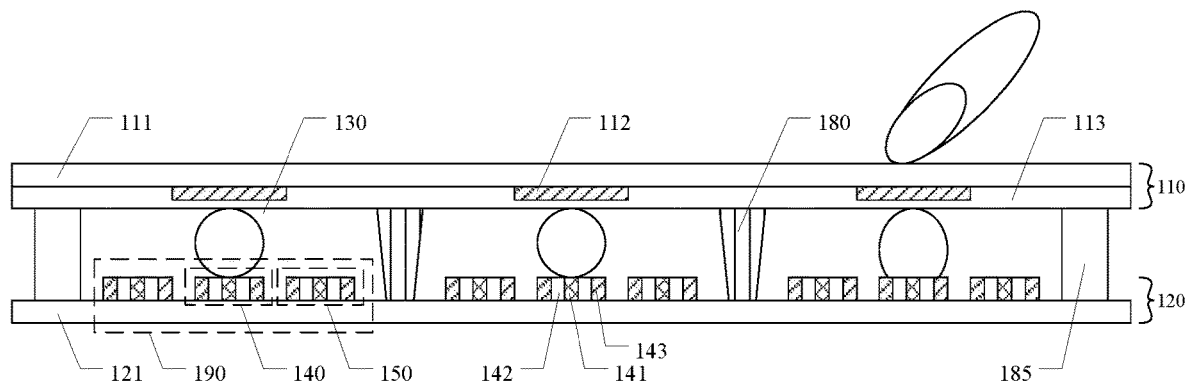
FIG. 3 is a schematic diagram of a touch panel being touched provided by an embodiment of the present disclosure.

In the touch panel provided by the present embodiment, the control electrode 112 can utilize a voltage to control the surface tension of the conductive fluid drop 130, so as to change the shape of the conductive fluid drop 130, so as to further change a distance between the conductive fluid drop 130 (a lower edge) and the touch electrode unit 190. At the time, the conductive fluid drop 130 can partially contact the touch electrode unit 190 or have a certain distance with the touch electrode unit 190, the touch electrode unit 190 is in a non-conducted state; for example, as illustrated by FIG. 2, the control electrode 112 utilizes a voltage to change the shape of the conductive fluid drop 130 into a sphere-like shape, at the time, the conductive fluid drop 130 partially contacts the touch electrode unit 190, for example, the conductive fluid drop 130 contacts one electrode of the touch electrode unit 190 (or, the conductive fluid drop 130 does not contact the touch electrode unit 190, the embodiments of the present disclosure are not limited thereto), the touch electrode unit 190 is not conducted; upon a position of the touch panel where the conductive fluid drop 130 is located being subjected to a touch operation, a case where the touch operation occurs at a side of the electrowetting substrate is described as an example, the force of the touch operation can make the electrowetting substrate 110 produce a certain deformation towards the touch substrate 120, so as to further shorten the distance between the conductive fluid drop 130 and the touch electrode unit and make the conductive fluid drop 130 conduct the touch electrode unit 190; at the time, it can be judged whether there is a touch operation by judging whether the touch electrode unit 190 is conducted or not; for example, as illustrated by FIG. 3, the electrowetting substrate 110 at a position of the touch panel subjected to a touch operation moves downward and drive the conductive fluid drop 130 move toward the touch electrode unit 190, so as to increase the contact area of the conductive fluid drop 130 and the touch electrode unit 190 and conduct the touch electrode unit 190. For example, the conductive fluid drop 130 can contact touch points which are insulated with each other in the touch electrode unit 190, so as to conduct the two touch points. Thus, the touch panel can utilize an electrowetting technology to control the surface tension of the conductive fluid drop to change the shape of the conductive fluid drop, and utilize the deformation produced by a touch operation to detect the touch operation, so as to provide a new type touch panel. It is to be noted that, upon the touch panel not working, the control electrode 112 may not be applied with a voltage, and the conductive fluid drop 130 can be attached on the first insulating layer 113 and represents a flat shape, at the time, the distance between the conductive fluid drop 130 and the touch electrode unit 190 is relatively large, even if the touch panel is touched, the conductive fluid drop 130 will not contact the touch electrode unit 190, so as to prevent mistakenly touching. It is to be noted that, the position where the touch operation occurs may be located at a side of the electrowetting substrate or a side of the touch substrate, the embodiments of the present disclosure are not limited thereto.

At another aspect, in the touch panel provided by the present embodiment, a magnitude of surface tension of the conductive fluid drop 130 can be adjusted by adjusting a magnitude of a voltage of the control electrode 112, so as to adjust the distance between the conductive fluid drop 130 (for example, a lower edge) and the touch electrode unit 190, so as to further judge whether there is a touch operation by judging whether the touch electrode unit 190 is conducted or not, and determine a magnitude of the touch force through a pre-stored corresponding relationship between voltages of the control electrode and the abovementioned distances. For example, the touch panel further includes a memory and a processing circuit, the memory can store the corresponding relationship between the voltages of the control electrode and the abovementioned distances, and the processing circuit can judge whether there is a touch operation and the magnitude of the touch force of the touch operation according to the voltage currently applied on the control electrode, the corresponding relationship of the voltages on the control electrodes and the distances between the control electrode and the touch electrode unit stored in the memory and whether the touch electrode unit is conducted or not. For example, the memory can be a ROM or RAM. It is to be noted that, the abovementioned memory and processing circuit can be integrated with the driving IC. For example, upon the distance between the conductive fluid drop 130 and the touch electrode unit 190 being H1, it can be judged that whether the touch operation can conduct the touch electrode unit 190; if the touch electrode unit 190 is conducted, it can be determined that there is a touch operation, and it can be determined that the force of the touch operation is P1 according to pre-stored data; if the touch electrode unit 190 is not conducted, it can be determined that there is no touch operation or the force of the touch operation is not big enough to conduct the touch electrode unit 190, i.e., the touch force is less than P1. Upon the distance between the conductive fluid drop 130 and the touch electrode unit 190 being H2, and H2 is smaller than H1, it can be judged that whether the touch operation can conduct the touch electrode unit 190, if the touch electrode unit 190 is conducted, it can be determined that there is a touch operation, and it can be determined that the force of the touch operation is P2 and P2 is smaller than P1 according to pre-stored data, if the touch electrode unit 190 is not conducted, it is determined that there is no touch operation or the force of the touch operation is not big enough to conduct the touch electrode unit 190, i.e., the touch force is smaller than P2. It is to be noted that, the abovementioned H2 may be zero, i.e., the conductive fluid drop 130 contacts the touch electrode unit 190, and more distances (for example, H1, H2, and H3) can be set to provide more recognition levels. Besides, the abovementioned method for judging the magnitude of the touch force is merely used to explain that the touch panel can recognize the magnitude of the force of the touch operation, the present embodiment can adopt other methods to recognize the magnitude of the force of the touch operation, the embodiments of the present disclosure are not limited thereto. Moreover, the touch panel can realize recognizing the magnitude of the touch force through the contact of the conductive fluid drop and the touch electrode unit, which can prevent the wastage produced by the contact of solid sensing elements, so as to enlarge the serve life of the touch panel.

For example, in the touch panel provided by an example of the present embodiment, a plurality of touch electrode units and corresponding conductive fluid drops and control electrodes can be provided to recognize the position of the touch operation.

For example, in the touch panel provided by an example of the present embodiment, as illustrated by FIGS. 1-3, the touch panel further includes a spacer 180 disposed between the electrowetting substrate 110 and the touch substrate 120, so as to maintain the distance between the electrowetting substrate 110 and the touch substrate 120.

For example, as illustrated by FIGS. 1-3, the adjacent touch electrode units 190 can be provided with a spacer 180 therebetween, so as to guarantee that a touch unit including a touch electrode unit 190 and the corresponding control electrode 112 and conductive fluid drop 130 can be relatively independent, that is to say, upon a region corresponding to the touch unit being touched and deformed, the adjacent touch units would not be affected, so as to prevent the regions corresponding the touch units adjacent to the touch unit being deformed, thereby improving the accuracy of position recognition of the touch operation upon the touch panel being used to recognize the position of the touch operation.

For example, a material of the first insulating layer may include a hydrophobic material, such as fluorine-containing polymer and polyimide.

For example, a material of the conductive fluid drop may be ink dispersed with conductive materials. For example, conductive material (gold, silver, copper, carbon, and the like) can be dispersed in a binder to form the abovementioned ink.

For example, in the touch panel provided by an example of the present embodiment, as illustrated by FIGS. 1-3, the touch panel further includes a sealant 185 disposed at the periphery of the electrowetting substrate 110 and the touch substrate 120.

Figure 4:
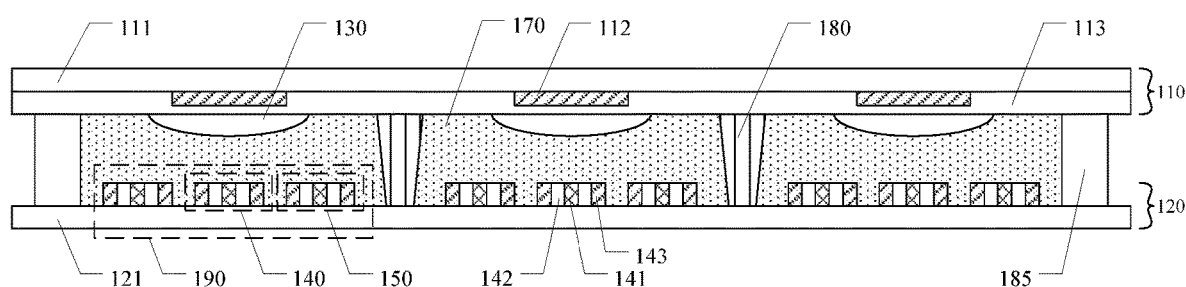
FIG. 4 is a structural schematic diagram of another touch panel provided by an embodiment of the present disclosure.

For example, in the touch panel provided by an example of the present embodiment, as illustrated by FIG. 4, the touch panel further includes an insulating fluid 170 disposed between the electrowetting substrate 110 and the touch substrate 120. Thus, the insulating fluid 170 can insulate the conductive fluid drop 130 and the touch electrode unit 190, and provide a certain buoyancy force to the conductive fluid drop 130, so as to restrain the conductive fluid drop 130 on the first insulating layer 113. Certainly, the insulating fluid and the conductive fluid drop are not soluble with each other.

For example, the insulating fluid can include deionized water or other insulating liquid with similar characteristics.

For example, in the touch panel provided by an example of the present embodiment, the density of the conductive fluid drop is smaller than that of the insulating fluid, such that the conductive fluid drop can be stably restrained on the first insulating layer 113.

Figure 5:
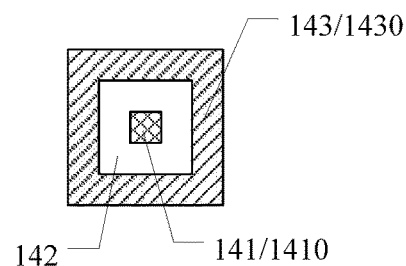
FIG. 5 is a structural schematic diagram of a touch sensing electrode provided by an embodiment of the present disclosure.

For example, in the touch panel provided by an example of the present embodiment, as illustrated by FIGS. 1 and 5, the touch electrode unit 190 includes a touch sensing electrode 140, the touch sensing electrode 140 includes: a first sensing electrode 141 and a second sensing electrode 143 which are insulated with each other, and the first sensing electrode 141 and the second sensing electrode 143 are disposed in the same layer. For example, the touch sensing electrode 140 further includes a first sensing insulating layer 142, and the first sensing insulating layer 142 is disposed between the first sensing electrode 141 and the second sensing electrode 143, so as to insulate the first sensing electrode 141 and the second sensing electrode 143. Upon the conductive fluid drop 130 disposed opposite to the touch electrode unit 190 not contacting the touch sensing electrode 140 or only contacting the first sensing electrode 141, the touch sensing electrode 140 is in a non-conducted state, i.e., the first sensing electrode 141 and the second sensing electrode 143 are insulated with each other; upon the conductive fluid drop 130 disposed opposite to the touch electrode unit 190 simultaneously contacting the first sensing electrode 141 and the second sensing electrode 143, the touch sensing electrode 140 is conducted, i.e., the first sensing electrode 141 and the second sensing electrode 143 can be electrically connected through the conductive fluid drop 130, at this time, it can be judged whether the touch sensing electrode 140 is conducted or not by applying an electrical signal to the first sensing electrode 141 and detecting an electrical signal on the second sensing electrode 143, or applying an electric signal to the second sensing electrode 143 and detecting an electrical signal on the first sensing electrode 141, so as to recognize a touch operation.

Figure 6:
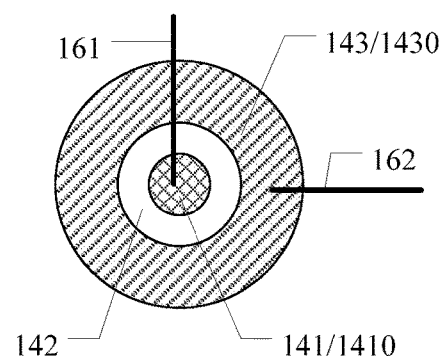
FIG. 6 is a schematic diagram of another touch sensing electrode provided by an embodiment of the present disclosure.

For example, in the touch panel provided by an example of the present embodiment, as illustrated by FIG. 5 and FIG. 6, the first sensing electrode 141 can be a center electrode 1410, and the second sensing electrode 143 can be a ringlike electrode 1430 surrounding the first sensing electrode 1410. Thus, upon the conductive fluid drop disposed opposite to the touch sensing electrode moving toward the touch sensing electrode, the conductive fluid drop would firstly contact the center electrode 1410 and then contact the ringlike electrode 1430, so as to realize recognizing a touch operation, and the specific description can refer to the abovementioned description.

For example, as illustrated by FIG. 5, a shape of the center electrode may be a rectangle or square. As illustrated by FIG. 6, the shape of the center electrode may also be a circle.

Correspondingly, as illustrated by FIG. 5, a shape of the ringlike electrode 1430 may be rectangle ring or square ring. As illustrated by FIG. 6, a shape of the ringlike electrode 1430 may be a circle ring. Certainly, the shape of the ringlike electrode 1430 can be other shapes, such as octagon ring, the embodiments of the present disclosure are not limited thereto.

For example, in the touch panel provided by an example of the present embodiment, upon sensing a touch operation, if the first sensing electrode is inputted with an electrical signal, and the second sensing electrode outputs an electrical signal, because different force of the touch operation would result in different contacting area of the conductive fluid drop and the second sensing electrode, so as to result in different contact resistance, at this time, the magnitude of the force of the touch operation can be determined by detecting the magnitude of the electrical signal outputted by the second sensing electrode. Thus, as illustrated by FIG. 6, along a direction parallel to the second base substrate 121 and passing through the center of the first sensing electrode 141, a width of the second sensing electrode 143 is larger than that of the first sensing electrode 141, so as to provide more force recognition levels. For example, upon being a circle shape, the center of the first sensing electrode is the center of the circle; upon being a rectangle shape, the center of the first sensing electrode is an intersection point of two diagonals of the rectangle. It is to be noted that, upon the second sensing electrode being inputted with an electrical signal, and the first sensing electrode outputting an electrical signal, the magnitude of the force of the touch operation can also be determined by detecting the magnitude of the electrical signal outputted by the first sensing electrode.

For example, in the touch panel provided by an example of the present embodiment, as illustrated by FIG. 6, the touch panel further includes a first electrode lead 161 electrically connected with the first sensing electrode 141 and a second electrode lead 162 electrically connected with the second sensing electrode 143. The first electrode lead 161 can be used to input an electrical signal, the second electrode lead 162 can be used to output an electrical signal, or the first electrode lead 161 can be used to output an electrical signal, and the second electrode lead 162 can be used to input an electrical signal.

Figure 7A:
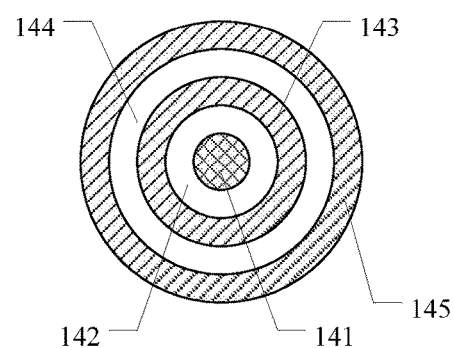
FIG. 7A is a schematic diagram of another touch sensing electrode provided by an embodiment of the present disclosure.

For example, in the touch panel provided by an example of the present embodiment, as illustrated by FIG. 7A, the touch sensing electrode further includes a third sensing electrode 145, the third sensing electrode 145 is insulated with the first sensing electrode 141 and the second sensing electrode 143 and disposed in the same layer with the first sensing electrode 141 and the second sensing electrode 143. As illustrated by FIG. 7A, the touch sensing electrode further includes a second sensing insulating layer 144. The second sensing electrode 145 and the second sensing insulating layer 144 can be disposed in the same layer with the first sensing electrode 141, the first sensing insulating layer 142 and the second sensing electrode 143, and the second sensing insulating layer 144 is disposed between the second sensing electrode 143 and the third sensing electrode 145. Thus, the third sensing electrode 145 insulated with the first sensing electrode 141 and the second sensing electrode 143 can be used to recognize different touch force. For example, upon sensing a touch operation, applying an electrical signal to the first sensing electrode 141, at this time, the conductive fluid drop 130 can partially contact the touch sensing electrode 140 or have a certain distance with the touch sensing electrode 140, the touch sensing electrode 140 is in a non-conducted state; if no electrical signal is detected on the second sensing electrode 143 and the third sensing electrode 145, it can be determined that there is no touch operation at the position corresponding to the touch sensing electrode 140; if an electrical signal is detected on the second sensing electrode 143 and no electrical signal is detected on the third sensing electrode 145, it can be determined that there is a touch operation at the position corresponding to the touch sensing electrode 140, and the force of the touch operation is P1; if an electrical signal is detected on both the second sensing electrode 143 and the third sensing electrode 145, it can be determined that there is a touch operation at the position corresponding to the touch sensing electrode 140, and the force of the touch operation is P2, and P2 is larger than P1. Certainly, the touch panel can be provided with more sensing electrodes and sensing insulating layers to provide more force recognition levels, the embodiments of the present disclosure are not limited thereto.

Figure 7B:
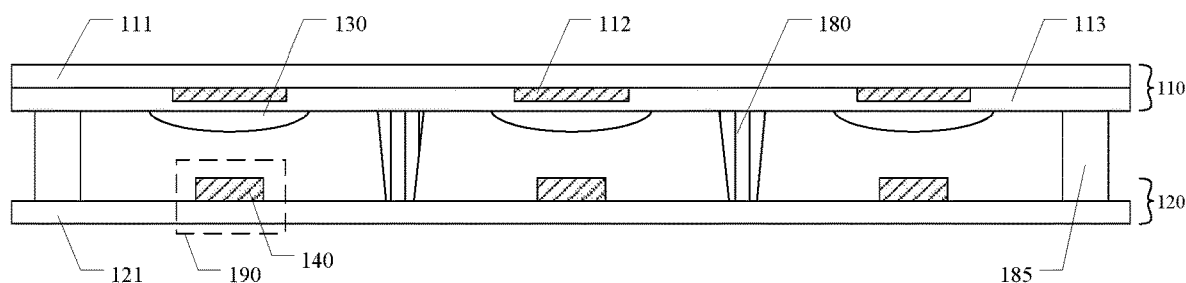
FIG. 7B is a schematic diagram of another touch panel provided by an embodiment of the present disclosure.

It is to be noted that, the embodiments of the present disclosure comprise but are not limited thereto, as illustrated by FIG. 7B, the touch sensing electrode 140 can also include one touch sensing electrode. Because the conductive fluid drop and the touch sensing electrode have contact resistance, if the conductive fluid drop does not contact the touch sensing electrode, the touch sensing electrode has a resistance R1, if the conductive fluid drop contacts the touch sensing electrode, the resistance of the touch sensing electrode becomes R2. The touch detection can also be realized by detecting the value of the resistance of the touch sensing electrode. Besides, after the conductive fluid drop contacting the touch sensing electrode, if the force is different, the contacting area of the conductive fluid drop and the touch sensing electrode will be different, and the contacting resistance between the conductive fluid drop and the touch sensing electrode will be different, thus, the touch force detection can be realized by detecting the value of the contacting resistance.

Second Embodiment

Figure 8:
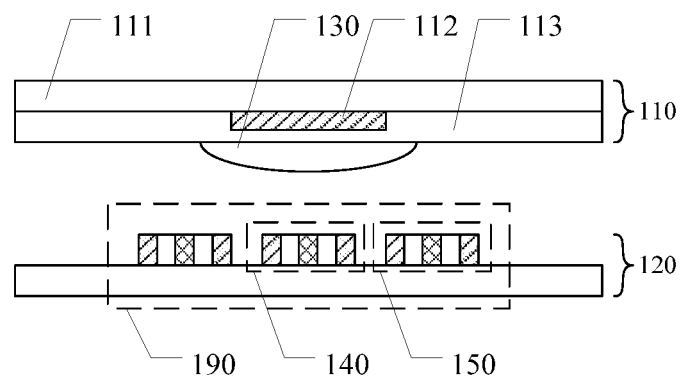
FIG. 8 is a schematic diagram of another touch panel provided by an embodiment of the present disclosure.

On the basis of the first embodiment, the present embodiment provides a touch panel, as illustrated by FIG. 8, the touch electrode unit 190 further includes at least one direction sensing electrode structure 150, the direction sensing electrode structure 150 and the touch sensing electrode 140 are disposed in a same layer and disposed in a periphery of the touch sensing electrode 140. For example, the direction sensing electrode structure 150 can be disposed around the touch sensing electrode 140 in a symmetrical arrangement. It is to be noted that, a plurality of direction sensing electrode structures 150 can be disposed, so as to realize recognizing different directions. Besides, when the touch panel is not required to recognize the moving direction of the touch operation, the touch electrode unit can merely include a touch sensing electrode and do not include any direction sensing electrode structure, and the embodiments of the present disclosure are not limited thereto.

For example, relative to the touch substrate 120, the electrowetting substrate 110 is movable.

In the touch panel provided by the present embodiment, an object such as a finger or a touch pen can drive the electrowetting substrate 110 to move relatively to the touch substrate 120 by utilizing a static friction force, so as to drive the control electrode 112 and the corresponding conductive fluid drop 130 to move; upon the conductive fluid drop 130 moving to a position on the direction sensing electrode structure 150 and conducting the direction sensing electrode structure 150, it can be determined that the moving direction of the touch operation is a direction from the touch sensing electrode 140 to the direction sensing electrode structure 150. Thus, the touch panel can recognize the moving direction of the touch operation, so as to provide more abundant touch experience and realize more abundant touch operation instructions. Besides, because the touch operation utilizes a static friction force to drive the electrowetting substrate to move, it is not required to move on the touch panel to accomplish various movement types of touch operations. Thus, the touch panel can be applied to electronic devices with small size, such as smart wearable devices. Moreover, the touch panel can transfer tiny movement of the touch operation into a relatively large movement of a pointer or icon on a display screen through a relatively large mapping proportion in a display device adopting the touch panel, so as to accomplish various types of touch instructions.

Figure 9:
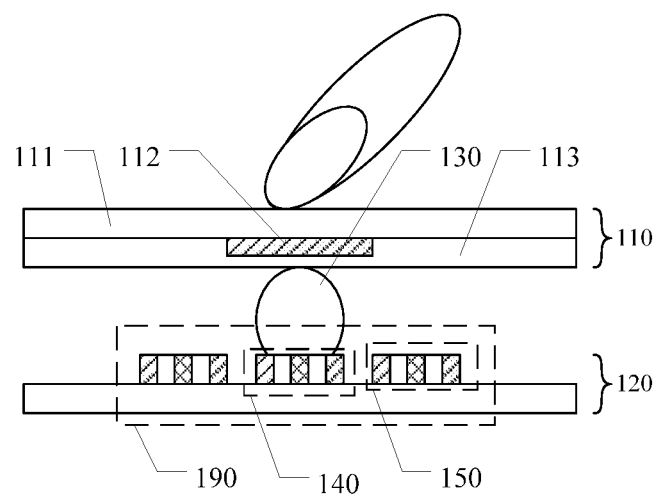
FIG. 9 is a schematic diagram of another touch panel being touched provided by an embodiment of the present disclosure.
Figure 10:
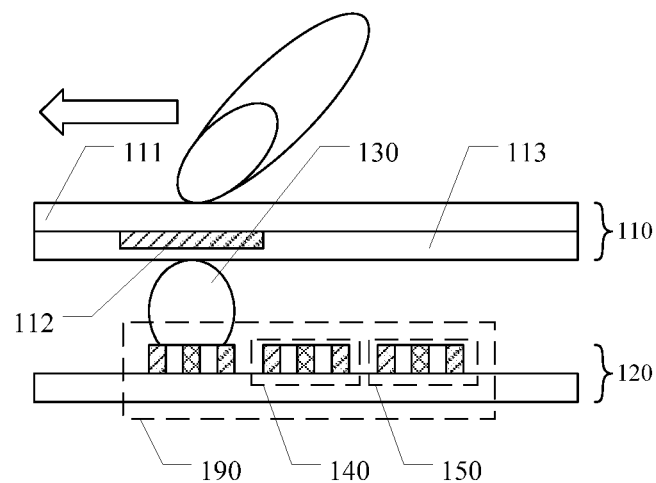
FIG. 10 is a schematic diagram of a touch panel sensing a moving direction of a touch operation provided by an embodiment of the present disclosure.
Figure 11:
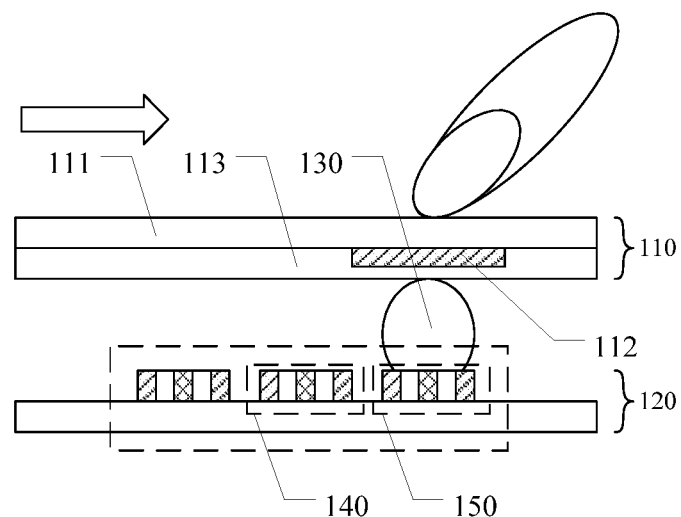
FIG. 11 is a schematic diagram of another touch panel sensing a moving direction of a touch operation provided by an embodiment of the present disclosure.

For example, as illustrated by FIG. 9, the control electrode 112 can utilize a voltage to control the surface tension of the conductive fluid drop 130, and make the conductive fluid drop 130 form a sphere-like shape, at the time, under the force of the touch operation (for example, a finger), the conductive fluid drop 130 conducts the touch sensing electrode 140; as illustrated by FIG. 10, under the action of the touch operation, relative to the touch substrate 120, the electrowetting substrate 110 moves leftward, so as to drive the control electrode 112 and the corresponding conductive fluid drop 130 to move to and conduct a direction sensing electrode 150 which is located at the left side of the touch sensing electrode 140, thus, it can be determined that the moving direction of the touch operation is a direction from the touch sensing electrode 140 to the direction sensing electrode structure 150 which is located at the left side of the touch sensing electrode 140; as illustrated by FIG. 11, under the action of the touch operation, relative to the touch substrate 120, the electrowetting substrate 110 moves rightward, so as to drive the control electrode 112 and the corresponding conductive fluid drop 130 to move to and conduct a direction sensing electrode structure 150 located at a right side of the touch sensing electrode 140, thus, it can be determined that the moving direction of the touch operation is a direction from the touch sensing electrode 140 to the direction sensing electrode structure 150 located at the right side of the touch sensing electrode 140.

For example, in the touch panel provided by an example of the present embodiment, as illustrated by FIGS. 8-11, the direction sensing electrode structure 150 may have a same structure with the touch sensing electrode 140, and the specific description may refer to the relevant description in the first embodiment. It is to be noted that, the direction sensing electrode structure have a same structure with the touch sensing electrode refers to that the direction sensing electrode structure and the touch sensing electrode have the same pattern of sensing electrodes (for example, the first sensing electrode and the second sensing electrode in the touch sensing electrode) and the same arrangement relationship of the sensing electrodes.

Figure 12:
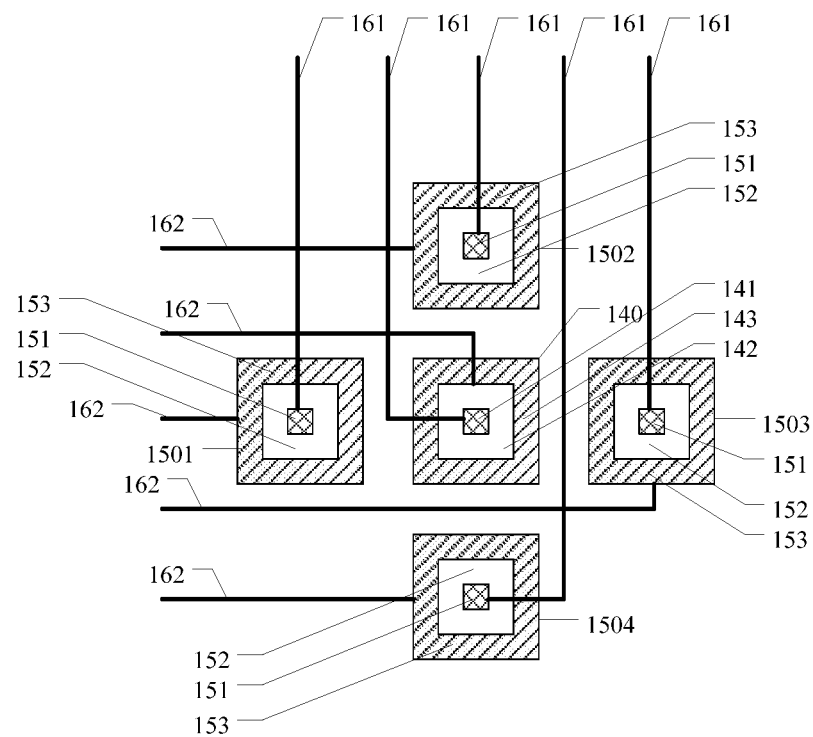
FIG. 12 is a structural schematic diagram of a touch electrode unit provided by an embodiment of the present disclosure.

For example, in the touch panel provided by an example of the present embodiment, as illustrated by FIG. 12, the at least one direction sensing electrode structure may include a first direction sensing electrode structure 1501, a second direction sensing electrode structure 1502; a third direction sensing electrode structure 1503; and a fourth direction sensing electrode structure 1504. The first direction sensing electrode structure 1501 and the third direction sensing electrode structure 1503 are arranged along a first direction and disposed at two sides of the touch sensing electrode 140, the second direction sensing electrode structure 1502 and the fourth direction sensing electrode structure 1504 are arranged along a second direction and disposed at two sides of the touch sensing electrode 140, and the first direction is perpendicular to the second direction. Thus, the touch panel can recognize four moving directions of the touch operation, and the four direction sensing electrode structures are uniformly dispersed in the periphery of the touch sensing electrode. It is to be noted that, in order to recognize more moving directions of the touch operation, more direction sensing electrode structures can be provided, and the embodiments of the present disclosure are not limited thereto.

For example, in the touch panel provided by an example of the present embodiment, as illustrated by FIG. 12, the first direction sensing electrode structure 1501, the second direction sensing electrode structure 1502, the third direction sensing electrode structure 1503, and the fourth direction sensing electrode structure 1504 can have the same structure with the touch sensing electrode 140, that is to say, the first direction sensing electrode structure 1501, the second direction sensing electrode structure 1502, the third direction sensing electrode structure 1503, and the fourth direction sensing electrode structure 1504 may respectively include a first direction sensing electrode 151, a second direction sensing electrode 153 and a first direction sensing insulating layer 152. The first direction sensing electrode 151, the first direction sensing insulating layer 152 and the second direction sensing electrode 153 are disposed in the same layer, and the first direction sensing insulating layer 152 is disposed between the first direction sensing electrode 151 and the second direction sensing electrode 153. The touch panel includes a plurality of first electrode leads 161 and a plurality of second electrode leads 162, the first electrode leads 161 are respectively electrically connected with the first sensing electrode 141 and the first direction sensing electrode 151 in the first direction sensing electrode structure 1501, the second direction sensing electrode structure 1502, the third direction sensing electrode structure 1503 and the fourth direction sensing electrode structure 1504; the second electrode leads 162 are respectively electrically connected with the second sensing electrode 143 in the touch sensing electrode 140 and the second direction sensing electrode 153 in the first direction sensing electrode structure 1501, the second direction sensing electrode structure 1502, the third direction sensing electrode structure 1503 and the fourth direction sensing electrode structure 1504. Thus, the touch electrode unit can be applied with an electrical signal and a detection electrical signal through the plurality of first electrode leads 161 and the plurality of second electrode leads 162, so as to realize various touch functions.

Figure 13:
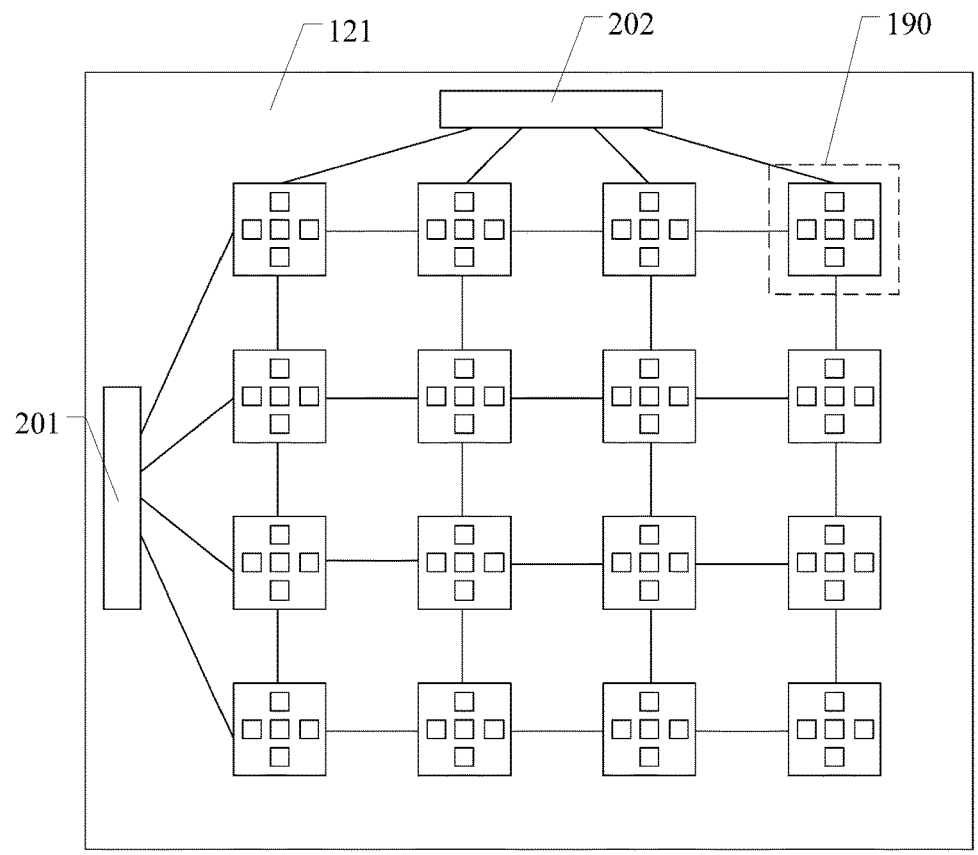
FIG. 13 is a structural schematic diagram of a touch electrode unit provided by an embodiment of the present disclosure.

For example, in the touch panel provided by an example of the present embodiment, as illustrated by FIG. 13, a plurality of touch electrode units 190 are disposed on the second base substrate 121 in an array, the touch electrode units 190 belonging to a same row can be connected and connected to a row driving circuit 201, and the touch electrode units 190 belonging to the same column can be connected and connected to a column driving circuit 202, so as to realize recognizing the position of the touch operation, and the specific driving method can refer to a common design, and the repeated portions are omitted herein.

Figure 14:
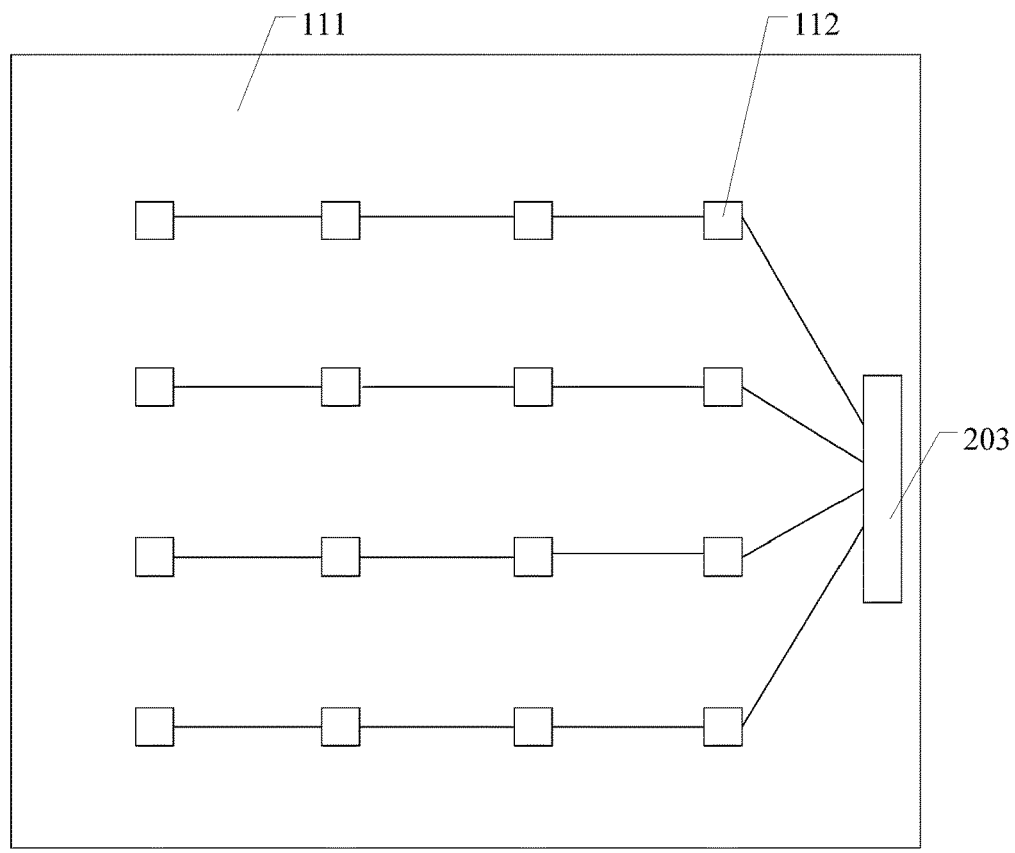
FIG. 14 is a plan view of an electrowetting substrate provided by an embodiment of the present disclosure.

For example, in the touch panel provided by an example of the present embodiment, as illustrated by FIG. 14, a plurality of control electrodes 112 are disposed on the first base substrate 111 in an array, the control electrodes 112 belonging to the same row can be connected and connected to a control electrode row driving circuit 203, so as to cooperate with the plurality of touch electrode units 190 disposed on the second base substrate 121 to realize the abovementioned various touch functions.

Third Embodiment

Figure 15:
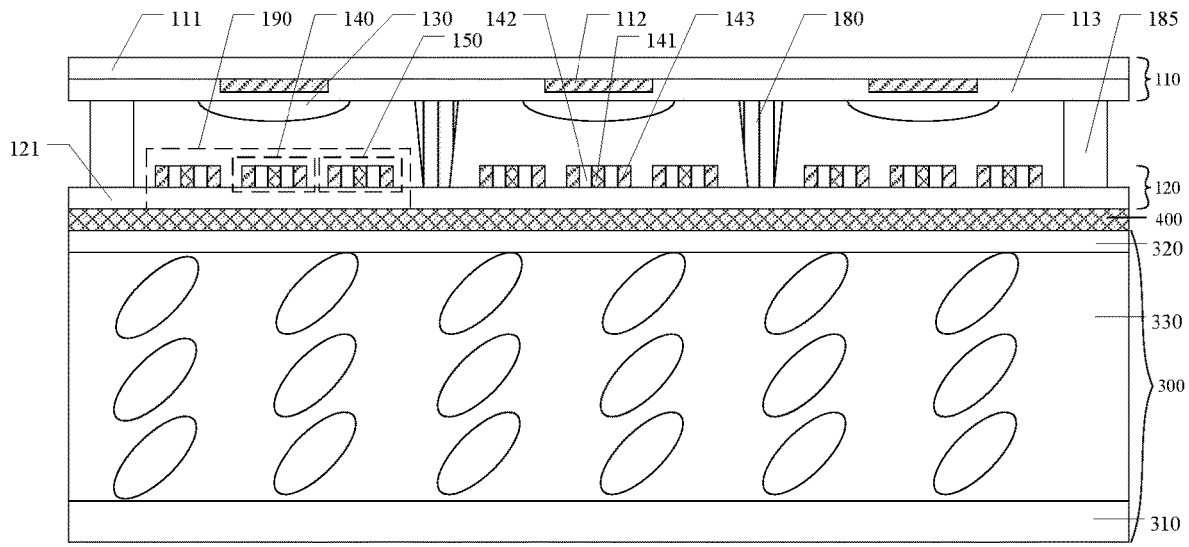
FIG. 15 is a structural schematic diagram of a display device provided by an embodiment of the present disclosure.

The present embodiment provides a display device. As illustrated by FIG. 15, the display device includes a display panel 300 and a touch panel 100, the touch panel 100 may include any one of the above-described touch panel. The display device includes any one of the above-described touch panels, thus, the display device has technical effects corresponding to the technical effects of the touch panel it includes, i.e., the display device can utilize an electrowetting technology to control the surface tension of a conductive fluid drop, to make the shape of the conductive fluid drop deform, so as to utilize the deformation produced by a touch to detect a touch operation, so as to provide a new type touch panel.

For example, as illustrated by FIG. 15, the display panel 300 may adopt a liquid crystal display panel, which includes an array substrate 310, an opposed substrate 320 and a liquid crystal layer 330 disposed between the array substrate 310 and the opposed substrate 320. Certainly, the display panel further includes an organic light emitting diode display panel, an electronic paper, and other display panels, the embodiments of the present disclosure are not limited thereto.

For example, in the display device provided by an example of the present embodiment, as illustrated by FIG. 15, the touch panel 100 is disposed at the displaying side of the display panel 300, and the touch substrate 120 is disposed at a side of the touch panel 100 close to the display panel 300. Thus, upon using the display device to perform a touch operation, an object such as a finger or a touch pen can directly contact the electrowetting substrate and realize various touch functions. Because the electrode structure on the electrowetting substrate is relatively simple, upon an object such as a finger or a touch pen contacting the electrowetting substrate and making the electrowetting substrate deform, the influence on the electrowetting substrate is relatively small, and the serve life of the display device can be enlarged. Certainly, the touch substrate can also be disposed at a side of the touch panel away from the display panel, and can realize various touch functions by the contact with the touch substrate, the embodiments of the present disclosure are not limited thereto.

For example, in the display device provided by an example of the present embodiment, as illustrated by FIG. 15, the display device further includes an adhesive layer 400, disposed between the touch panel 100 and the display panel 300. The adhesive layer 400 is used to bond the touch panel 100 to the display panel 300.

Fourth Embodiment

Figure 16:
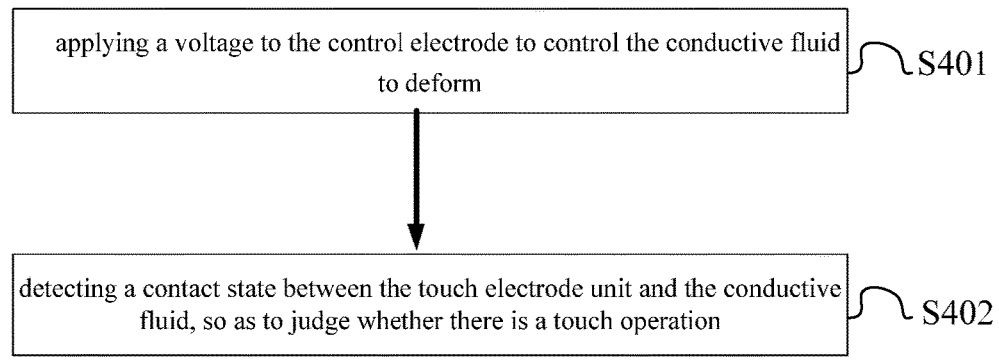
FIG. 16 is a flow diagram of a touch detection method of a touch panel provided by an embodiment of the present disclosure.

The present embodiment provides a sensing method of a touch panel, i.e., a touch detection method of a touch panel. The touch panel includes: an electrowetting substrate and a touch substrate which are disposed oppositely, and a conductive fluid drop disposed between the electrowetting substrate and the touch substrate. The electrowetting substrate includes a first base substrate, a control electrode disposed on the first base substrate, and a first insulating layer disposed on the first base substrate and the control electrode, the first insulating layer covers the control electrode; the touch substrate comprises a second base substrate and a touch electrode unit disposed at a side of the second base substrate close to the electrowetting substrate; the conductive fluid drop is disposed at a side of the first insulating layer away from the control electrode, and corresponds to the touch electrode; the touch electrode unit and the conductive fluid drop are disposed opposite to each other. As illustrated by FIG. 16, the touch detection method includes steps S401-S403.

Step S402: applying a voltage to the control electrode to control the conductive fluid drop to deform.

For example, during a touch time period, applying a voltage to the control electrode to control the conductive fluid drop, to increase the surface tension of the conductive fluid drop to form a sphere-like shape. Thus, a distance between a lower edge of the conductive fluid drop and the touch substrate becomes smaller.

Step S402: detecting a contacting state of the touch electrode unit and the conductive fluid drop, to judge whether there is a touch operation. The abovementioned contacting state includes electrical connection.

For example, detecting whether the touch electrode unit is conducted or not, to judge whether there is a touch operation.

For example, upon the touch electrode unit being conducted, it can be determined that there is a touch operation at a region corresponding to the touch electrode unit; upon the touch electrode unit being not conducted, it can be determined that there is no touch operation at a region corresponding to the touch electrode unit.

In the touch detection method provided by the present embodiment, through the step S401, the control electrode can utilize a voltage to control the surface tension of the conductive fluid drop, so as to increase the surface tension of the conductive fluid drop to make the conductive fluid drop form a sphere-like shape, so as to further change the distance between the lower edge of the conductive fluid drop and the touch electrode unit. At this time, the conductive fluid drop can partially contact the touch electrode unit or has a certain distance with the touch electrode unit, the touch electrode unit is in a non-conducted state; upon a touch operation occurring at a position of the touch panel where the conductive fluid drop is located, a case where the touch operation occurs at a side of the electrowetting substrate is described as an example, the force of the touch operation can make the electrowetting substrate produce a certain deformation towards the touch substrate, so as to further shorten the distance between the conductive fluid drop and the touch electrode unit and make the conductive fluid drop conduct the touch electrode unit; at the time, it can be judged whether there is a touch operation by judging whether the touch electrode unit is conducted or not through the step S402. Thus, the touch detection method can utilize an electrowetting technology to control the surface tension of the conductive fluid drop to change the shape of the conductive fluid drop, and utilize the deformation produced by the touch to detect the touch operation, so as to provide a new type of touch panel. It is to be noted that, upon the touch panel not working, the control electrode may not be applied with a voltage, and the conductive fluid drop can be attached on the first insulating layer and represents a flat shape, at the time, the distance between the conductive fluid drop and the touch electrode unit is relatively large, even if the touch panel is touched, the conductive fluid drop will not contact the touch electrode unit, so as to prevent mistakenly touching.

For example, in the touch detection method provided by an example of the present embodiment, the touch electrode unit includes a touch sensing electrode, the touch sensing electrode includes: a first sensing electrode and a second sensing electrode which are insulated with each other. For example, the touch sensing electrode includes a first sensing electrode, a second sensing electrode and a first sensing insulating layer, the first sensing electrode, the first sensing insulating layer and the second sensing electrode are disposed in the same layer, the first sensing insulating layer is disposed between the first sensing electrode and the second sensing electrode, the touch detection method further includes: applying an electric signal to one of the first sensing electrode and the second sensing electrode; and detecting whether the other one of the first sensing electrode and the second sensing electrode outputs an electric signal, so as to judge whether the touch electrode unit is conducted or not.

For example, applying an electrical signal to the first sensing electrode and detecting whether the second sensing electrode outputs an electrical signal, or applying an electrical signal to the second sensing electrode and detecting whether the first sensing electrode outputs an electric signal. Thus, it can be judged that whether the touch sensing electrode is conducted or not, so as to judge whether the touch electrode unit is conducted by the conductive fluid drop, so as to further recognize a touch operation.

For example, upon the first sensing electrode being inputted with an electrical signal, and the second sensing electrode outputting an electrical signal, because different force of the touch operation will result in different contacting area of the conductive fluid drop and the second sensing electrode, so as to result in different contacting resistance, at this time, the magnitude of the force of the touch operation can be determined by detecting the magnitude of the electrical signal outputted by the second sensing electrode.

For example, the touch detection method provided by an example of the present embodiment may further include: during a time period when the touch operation occurs, gradually increasing the voltage applied on the control electrode; and recording the voltage applied on the control electrode upon it being detected that the touch electrode unit is conducted, so as to judge the magnitude of the force of the touch operation. For example, during the time period when the touch operation occurs, by means of gradually increasing the voltage applied on the control electrode, the distance between a lower edge of the conductive fluid drop and the touch substrate gradually decreases, upon the distance between the conductive fluid drop and the touch electrode unit being H1, detecting whether the touch electrode unit is conducted or not; if the touch electrode unit 190 is conducted, it can be determined that there is a touch operation, and it can be determined that the force of the touch operation is P1 according to pre-stored data, if the touch electrode unit 190 is not conducted, it can be determined that there is no touch operation or the touch operation is not big enough to conduct the touch electrode unit 190, i.e., the touch force is smaller than P1; upon the distance between the conductive fluid drop 130 and the touch electrode unit 190 being 112, and H2 is smaller than H1, judging whether the touch operation conducts the touch electrode unit 190 or not; if the touch electrode unit 190 is conducted, it can be determined that there is a touch operation, and it can be determined that the force of the touch operation is P2 according to the pre-stored data, and P2 is smaller than P1, if the touch electrode unit 190 is not conducted, it can be determined that there is no touch operation or the force of the touch operation is not big enough to conduct the touch electrode unit 190, i.e., the touch force is smaller than P2. For example, a corresponding relationship between the voltages applied on the control electrode and the distances of the control electrode and the touch electrode unit can be stored, such that whether there is a touch operation and the magnitude of the force of the touch operation can be determined according to the value of the recorded voltage applied on the control electrode, the corresponding relationship between the voltages applied on the control electrode and the distances of the control electrode and the touch electrode unit, and the fact whether the touch electrode unit is conducted or not.

Certainly, the present embodiment may adopt more voltage variations, so as to generate more distances, so as to further provide more force recognition levels, and the embodiments of the present disclosure are not limited thereto. Besides, the magnitude of the voltage applied on the control electrode can be gradually reduced, and the embodiments of the present disclosure are not limited thereto. It is to be noted that, the abovementioned time period when the touch operation occurs refers to a time period when the touch operation has effect on the touch panel and make the touch panel deform during the touch time period.

For example, in the touch detection method provided by an example of the present embodiment, the touch sensing electrode further includes a third sensing electrode, which is respectively insulated with the first sensing electrode and the second sensing electrode. For example, the touch sensing electrode further includes a second sensing insulating layer, the third sensing electrode and the second sensing insulating layer are disposed at the same layer with the first sensing electrode, the first sensing insulating layer and the second sensing electrode, the second sensing insulating layer is disposed between the second sensing electrode and the third sensing electrode. The touch detection method further includes: detecting whether the third sensing electrode outputs an electrical signal or not. Thus, upon applying an electrical signal to the first sensing electrode and detecting whether the second sensing electrode outputs an electrical signal or not, detecting whether the third sensing electrode outputs an electrical signal or not, if no electrical signal is detected on both the second sensing electrode and the third sensing electrode, it can be determined that there is no touch operation at a position corresponding to the touch sensing electrode, if an electrical signal is detected on the second sensing electrode, and no electrical is detected on the third sensing electrode, it can be determined that there is a touch operation at the position corresponding to the touch sensing electrode, and the force of the touch operation is P1, if an electrical signal is detected on both the second sensing electrode and the third sensing electrode, it can be determined that there is a touch operation at the position corresponding to the touch sensing electrode, and the force of the touch operation is P2, and P2 is larger than P1. Certainly, more sensing electrodes and sensing insulating layers can be set to provide more force recognition levels, and the embodiments of the present disclosure are not limited thereto.

For example, in the touch detection method provided by an example of the present embodiment, the touch electrode unit further includes at least one direction sensing electrode structure, the direction sensing electrode structure is disposed in the same layer with and in the periphery of the touch sensing electrode. The touch detection method further includes: detecting whether the direction sensing electrode structure is conducted or not, so as to judge whether the touch operation moves along a direction from the touch sensing electrode to the direction sensing electrode structure. Thus, the touch detection method can realize recognizing the moving direction of the touch operation, and the specific description may refer to the relevant description in the first embodiment, and repeated portions are omitted herein.

For example, the electrowetting substrate is movable relative to the touch substrate.

The following statements should be noted:

(1) The accompanying drawings involve only the structure(s) in connection with the embodiment(s) of the present disclosure, and other structure(s) can be referred to common design(s).

(2) For the purpose of clarity only, in accompanying drawings for illustrating the embodiment(s) of the present disclosure, the thickness and size of a layer or a structure may be enlarged. However, it should understood that, in the case in which a component or element such as a layer, film, area, substrate or the like is referred to be "on" or "under" another component or element, it may be directly on or under the another component or element or a component or element is interposed therebetween.

(3) In case of no conflict, features in one embodiment or in different embodiments can be combined.

The foregoing is only the preferred embodiments of the present invention and not intended to limit the scope of protection of the present invention. Any variations or replacements which can be easily thought of by those skilled in the art in the scope of the present disclosure all shall fall within the scope of protection of the present disclosure. The scope of protection of the present invention should be defined by the appended claims.

The invention claimed is:

1. A touch panel, comprising:
an electrowetting substrate, a conductive fluid drop and a touch substrate,
wherein the touch substrate and the electrowetting substrate are disposed opposite to each other, the conductive fluid drop is disposed between the electrowetting substrate and the touch substrate;
the electrowetting substrate comprises a first base substrate, a control electrode disposed at a side of the first base substrate opposite to the touch substrate, and a first insulating layer disposed at a side of the control electrode opposite to the touch substrate;
the touch substrate comprises a second base substrate and a touch electrode unit disposed at a side of the second base substrate opposite to the electrowetting substrate;
the conductive fluid drop is disposed at a side of the first insulating layer away from the control electrode, and corresponds to the control electrode; the touch electrode unit and the conductive fluid drop are disposed opposite to each other; the touch panel is configured to allow the conductive fluid drop to contact the touch electrode unit under the control of the control electrode to recognize a touch operation upon a touch occurring,
wherein the touch electrode unit comprises a touch sensing electrode, the touch sensing electrode comprises: a first sensing electrode and a second sensing electrode which are insulated with each other, and the first sensing electrode and the second sensing electrode are disposed in a same layer, wherein the touch panel is configured to allow the conductive fluid drop to contact the touch electrode unit under the control of the control electrode so that the first sensing electrode and the second sensing electrode are conducted to recognize the touch operation upon the touch occurring.

2. The touch panel according to claim 1, wherein the first sensing electrode is a center electrode, and the second sensing electrode is a ringlike electrode surrounding the first sensing electrode.

3. The touch panel according to claim 2, wherein a shape of the ringlike electrode comprises a rectangle ring, an octagonal ring or a circular ring.

4. The touch panel according to claim 3, further comprising:
a first electrode lead, electrically connected with the first sensing electrode; and
a second electrode lead, electrically connected with the second sensing electrode,
wherein the first electrode lead is configured to input an electrical signal, the second electrode lead is configured to output an electrical signal, or the first electrode lead is configured to output an electrical signal, the second electrode lead is configured to input an electrical signal.

5. The touch panel according to claim 2, wherein, along a direction parallel to the second base substrate and passing through a center of the first sensing electrode, a width of the second sensing electrode is larger than that of the first sensing electrode.

6. The touch panel according to claim 1, wherein the touch sensing electrode further comprises:
a third sensing electrode,
wherein the third sensing electrode is insulated with the first sensing electrode and the second sensing electrode, and the third sensing electrode, the first sensing electrode and the second sensing electrode are disposed in a same layer.

7. The touch panel according to claim 1, wherein the touch electrode structure further comprises at least one direction sensing electrode structure, the direction sensing electrode structure and the touch sensing electrode are disposed at intervals in a same layer and disposed in a periphery of the touch sensing electrode.

8. The touch panel according to claim 7, wherein the direction sensing electrode structure and the touch sensing electrode have a same structure.

9. The touch panel according to claim 1, further comprising:
an insulating fluid, disposed between the electrowetting substrate and the touch substrate.

10. The touch panel according to claim 1, wherein a density of the conductive fluid drop is smaller than that of the insulating fluid.

11. A display device, comprising a display panel and a touch panel, wherein the touch panel comprises the touch panel according to claim 1.

12. A touch detection method for the touch panel according to claim 1, comprising:
applying a voltage to the control electrode to control the conductive fluid drop to deform;
detecting a contact state between the touch electrode unit and the conductive fluid drop, so as to judge whether there is a touch operation.

13. The touch detection method according to claim 12, wherein the detecting a contact state between the touch electrode unit and the conductive fluid drop, so as to judge whether there is a touch operation comprises:
detecting whether the first sensing electrode and the second sensing electrode are conducted or not to judge whether there is a touch operation.

14. The touch detection method according to claim 13, the detecting whether the first sensing electrode and the second sensing electrode are conducted or not to judge whether there is a touch operation comprises:
applying an electrical signal to one of the first sensing electrode and the second sensing electrode; and
detecting whether the other one of the first sensing electrode and the second sensing electrode outputs an electrical signal.

15. The touch detection method according to claim 13, further comprising:
applying an electrical signal to one of the first sensing electrode and the second sensing electrode; and
detecting a magnitude of an electrical signal on the other one of the first sensing electrode and the second sensing electrode to judge a magnitude of the touch pressure.

16. The touch detection method according to claim 13, wherein the touch sensing electrode further comprises: a third sensing electrode, the third sensing electrode is insulated with the first sensing electrode and the second sensing electrode, and the third sensing electrode, the first sensing electrode and the second sensing electrode are disposed in a same layer, the touch detection method further comprises:
detecting whether the third sensing electrode outputs an electrical signal or not.

17. The touch detection method according to claim 13, wherein the touch electrode unit further comprises at least one direction sensing electrode structure, the direction sensing electrode structure and the touch sensing electrode are disposed at intervals in a same layer and disposed in a periphery of the touch sensing electrode, the touch detection method further comprises:
detecting whether the direction sensing electrode structure is conducted or not, so as to judge whether the touch operation moves along a direction from the touch sensing electrode to the direction sensing electrode structure.

18. The touch detection method according to claim 12, further comprising:
during a time period which the touch operation occurs, gradually increasing or decreasing a magnitude of the voltage applied to the control electrode; and
upon detecting the touch electrode unit is conducted, recording the magnitude of the voltage applied on the control electrode.

19. A touch panel, comprising:
an electrowetting substrate, a conductive fluid drop and a touch substrate,
wherein the touch substrate and the electrowetting substrate are disposed opposite to each other, the conductive fluid drop is disposed between the electrowetting substrate and the touch substrate;
the electrowetting substrate comprises a first base substrate, a control electrode disposed at a side of the first base substrate opposite to the touch substrate, and a first insulating layer disposed at a side of the control electrode opposite to the touch substrate;
the touch substrate comprises a second base substrate and a touch electrode unit disposed at a side of the second base substrate opposite to the electrowetting substrate;
the conductive fluid drop is disposed at a side of the first insulating layer away from the control electrode, and corresponds to the control electrode; the touch electrode unit and the conductive fluid drop are disposed opposite to each other; the touch panel is configured to allow the conductive fluid drop to contact the touch electrode unit under the control of the control electrode to recognize a touch operation upon a touch occurring, the touch electrode unit comprises a touch sensing electrode, the touch sensing electrode comprises: a first sensing electrode and a second sensing electrode which are insulated with each other, and the first sensing electrode and the second sensing electrode are disposed in a same layer, wherein the touch electrode structure further comprises at least one direction sensing electrode structure, the direction sensing electrode structure and the touch sensing electrode are disposed at intervals in a same layer and disposed in a periphery of the touch sensing electrode, wherein the at least one direction sensing electrode comprises:

a first direction sensing electrode structure;
a second direction sensing electrode structure;
a third direction sensing electrode structure; and
a fourth direction sensing electrode structure,
wherein the first direction sensing electrode structure and the third direction sensing electrode structure are arranged along a first direction and disposed at two sides of the touch sensing electrode, the second direction sensing electrode structure and the fourth direction sensing electrode structure are arranged along a second direction and disposed at two sides of the touch sensing electrode, and the first direction is perpendicular to the second direction.

* * * * *